(12) United States Patent
Blyumen

(10) Patent No.: US 10,192,175 B2
(45) Date of Patent: Jan. 29, 2019

(54) NAVIGATING INTERACTIVE VISUALIZATIONS WITH COLLABORATIVE FILTERING

(71) Applicant: ORACLE INTERNATIONAL CORPORATION, Redwood Shores, CA (US)

(72) Inventor: Julia Blyumen, Scotts Valley, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 167 days.

(21) Appl. No.: 14/259,196

(22) Filed: Apr. 23, 2014

(65) Prior Publication Data

US 2015/0309714 A1 Oct. 29, 2015

(51) Int. Cl.
G06F 3/048 (2013.01)
G06Q 10/06 (2012.01)
G06F 3/0484 (2013.01)

(52) U.S. Cl.
CPC ....... G06Q 10/063 (2013.01); G06F 3/04842 (2013.01)

(58) Field of Classification Search
None
See application file for complete search history.

(56) References Cited

U.S. PATENT DOCUMENTS 8,694,514 B2 4/2014 Frieden et al.
8,856,670 B1* 10/2014 Thakur .................. G06F 9/451
715/765
8,903,810 B2* 12/2014 Ismalon ............... G06F 17/3064
382/159
9,261,376 B2* 2/2016 Zheng ................ G01C 21/3484
9,799,041 B2* 10/2017 Karty ...................... G06N 3/126
(Continued)

OTHER PUBLICATIONS

"Business Intelligence 2.0: Simpler, More Accessible, Inevitable," http://www.information week.com/software/information-management/business-intelligence-20-simpler-more-accessible-inevitable/d/d-id/1051440?, retrieved from the internet Jan. 25, 2007, Copyright 2017, 5 pages.

(Continued)

Primary Examiner — Hua Lu
(74) Attorney, Agent, or Firm — Kilpatrick Townsend & Stockton LLP

(57) ABSTRACT

Embodiments of the invention provide systems and methods for navigating interactive visualizations of a business analysis application based on collaborative filtering. More specifically, embodiments of the present invention provide a recommender that functions together with a visualization tool and business analytics application. This recommender can track use of interactive visualizations provided by the visualization tool, e.g., views selected, functions performed, navigation between views, etc., by various users to build a set of inquiry histories. Then, based on these histories and possibly other considerations, recommendations can be made to a current user as to which views, functions, etc. might be useful or insightful. In other words, embodiments of the present invention track the analysis behavior of each user and recommend which views may be of interest for the corresponding analysis task based on the behavior of similar users in similar situations.

20 Claims, 13 Drawing Sheets

(56) References Cited

U.S. PATENT DOCUMENTS

| | | | | |
|---|---|---|---|---|
| 2004/0030741 A1* | 2/2004 | Wolton | G06F 17/30873 | 709/202 |
| 2006/0048059 A1* | 3/2006 | Etkin | G06F 17/30699 | 715/745 |
| 2009/0300547 A1* | 12/2009 | Bates | G06F 17/30873 | 715/825 |
| 2010/0017307 A1* | 1/2010 | Barbour | G06Q 10/10 | 705/26.1 |
| 2010/0057698 A1* | 3/2010 | Prasad Kantamneni | G06F 17/30867 | 707/E17.015 |
| 2011/0078160 A1* | 3/2011 | Gotz | G06F 17/30528 | 707/750 |
| 2011/0283236 A1* | 11/2011 | Beaumier | G07F 11/002 | 715/835 |
| 2012/0041769 A1* | 2/2012 | Dalal | G06Q 10/101 | 705/1.1 |
| 2014/0188838 A1* | 7/2014 | Strugov | G06F 17/30867 | 707/710 |
| 2014/0214803 A1* | 7/2014 | Karni | G06F 17/30554 | 707/722 |
| 2014/0280068 A1* | 9/2014 | Dhoopar | G06F 17/30554 | 707/722 |
| 2016/0048556 A1* | 2/2016 | Kelly | G06F 17/30867 | 707/767 |

OTHER PUBLICATIONS

Mirel et al., "Visualizing complexity:Getting from here to there in ill-defined problem landscapes," //www.knowledgepresentation.org/BuildingTheFuture/AllmendingerMirel/AllmendingerMirel.html, retrieved from the internet Jan. 24, 2017, Copyright 2004, 9 pages.

Jankun-Kelly et al., "A Model and Framework for Visualization Exploration, IEEE Transactions on Visualization and Computer Graphics," vol. 13, No. 2, Mar./Apr. 2007, 357-369.

"Collaborative Filtering, " retrieved from the Wikipedia, the free encyclopedia Jan. 25, 2017; 8 pages.

Chatzopoulou et al., "Query Recommendations for Interactive Database Exploration", M. Winslett (Ed.): SSDBM 2009, LNCS 5566, Copyright 2009, pp. 3-18.

* cited by examiner

NAVIGATING INTERACTIVE VISUALIZATIONS WITH COLLABORATIVE FILTERING

BACKGROUND OF THE INVENTION

Embodiments of the present invention relate generally to methods and systems for navigating interactive visualizations of a business analysis application and more particularly to navigating interactive visualizations of a business analysis application based on collaborative filtering.

Generally speaking, business analytics are applications or functions used to perform analysis such as statistical analysis, what-if analysis, various planning and monitoring analysis, etc., on a set of business data such as financial and/or accounting data, supply chain information, project management information, etc. In business analytic applications, a popular trend is to use visualizations to represent these sets of data because there is more and more data and presenting it in a tabular form is not insightful or even useful. So most analytic software produces and presents graphs of different types which can be navigated and interacted with by users through a visualization tool. An analytic application queries the data and then presents the results to a user as a table or graph ("visualization"). Users can further analyze the data by manipulating the visualizations in search of insight.

But even a simple visualization produces many views, i.e., certain perspective on that visualization, e.g., sales by region, by product, by sales team, etc. For example, a simple visualization that shows revenue trend of a business by region by product by time. If the business operates in 4 regions, sells 4 products, and has been in business for 4 years. The combination of these parameters results in 64 views of sales data. But in many actual implementations, each region is made up of dozens of countries and/or hundreds of regions. If the visualization allows the user to view sales by country and/or region, there will be thousands and thousands of additional views. In the real world, a business might also have many more products. Thus, the number of possible views could easily exceed what a human being can manage, and only some views (alone or in combination) possibly contain insight. A major problem for users of such visualizations becomes determining which views contain the insights that will be helpful to them. Current analytic applications provide no support to the users in finding insightful views of a visualization. Often users won't even know where to start their exploration. Hence, there is a need for improved methods and systems for navigating interactive visualizations of a business analysis application.

BRIEF SUMMARY OF THE INVENTION

Embodiments of the invention provide systems and methods for navigating interactive visualizations of a business analysis application based on collaborative filtering. According to one embodiment, providing interactive visualizations with collaborative filtering can comprise generating a plurality of inquiry histories for one or more interactive visualizations based on user interactions with the interactive visualizations. The one or more interactive visualizations can each provide a plurality of views of a set of application data. An interaction of a user with a selected interactive visualization of the one or more interactive visualizations can be received. The received interaction of the user with the selected interactive visualization can comprise a query or a navigation action. A recommendation can be made to the user based on the received interaction, the selected interactive visualization, and the generated plurality of inquiry histories. The recommendation to the user can comprise a suggested next action.

Generating the plurality of inquiry histories for the one or more interactive visualizations can comprise monitoring the one or more interactive visualizations, detecting, based on said monitoring, the interaction of the user with the selected interactive visualization, capturing an action of the user and a current state of the selected interactive visualization, and recording the captured action of the user and the current state of the selected interactive visualization as an inquiry history. Capturing the current state of the selected interactive visualization can comprise capturing one or more of a current view, one or more selected filters, one or more filter criteria, or one or more attributes of the interactive visualization. The action of the user can comprise one or more of making a query through the selected interactive visualization, selecting a function of the selected interactive visualization, or navigating through the selected interactive visualization.

Making the recommendation to the user can comprise generating a graph representing at least a subset of the generated plurality of inquiry histories, determining a state of the selected interactive visualization, determining one or more actions based on the generated graph and the determined state of the selected interactive visualization, and providing the determined one or more actions to the user as recommendations. Each of the vertices of the graph can represent a state of the interactive visualizations saved in the inquiry histories and edges of the graph can represent navigation between the states of the interactive visualizations saved in the inquiry histories. The inquiry histories can, in some cases, further comprise saved user information. In such cases, determining one or more actions can be further based on information for the user and corresponding saved user information from the inquiry histories.

DETAILED DESCRIPTION OF THE INVENTION

Figure 1:
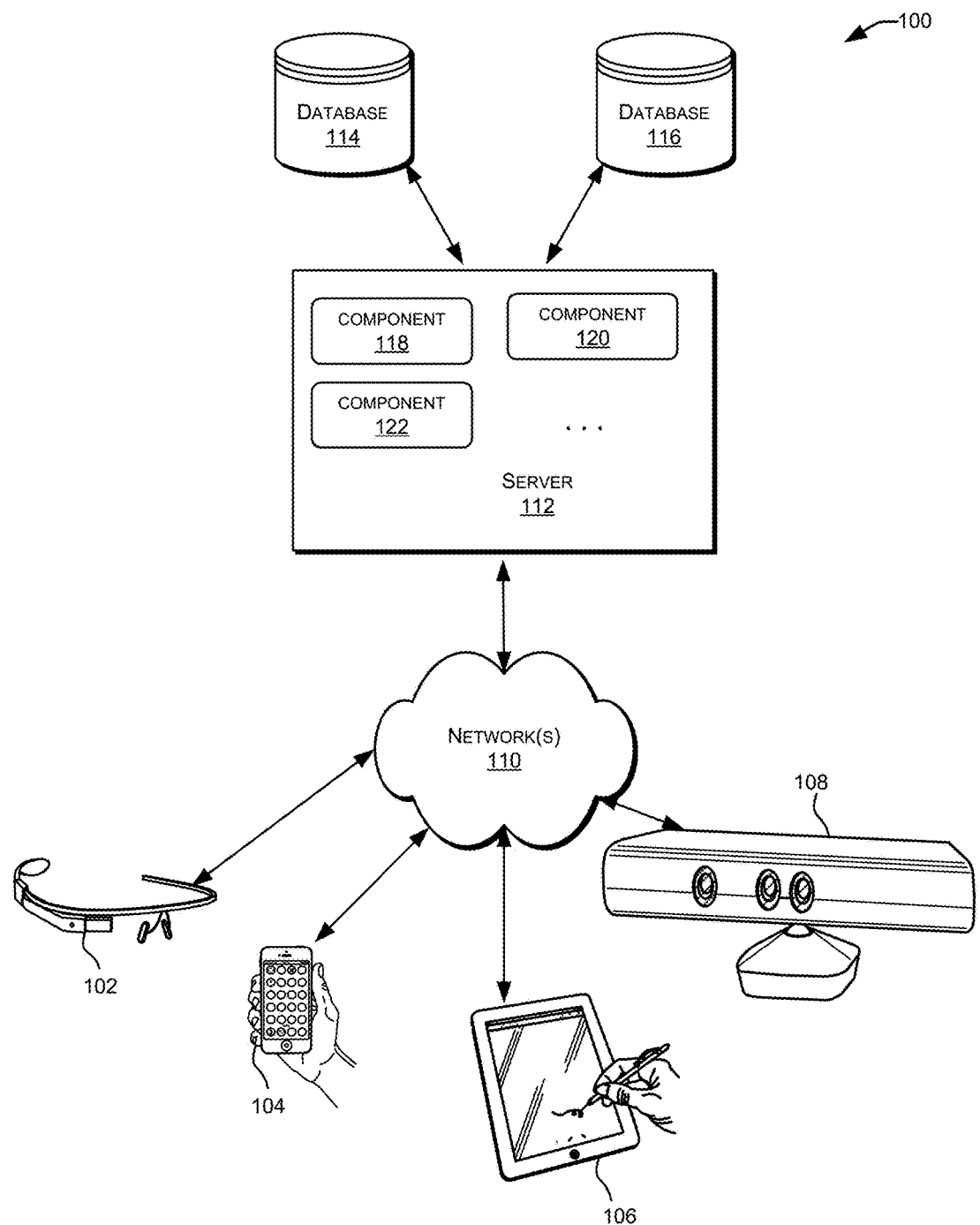
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for navigating interactive visualizations of a business analysis application based on collaborative filtering. More specifically, embodiments of the present invention provide a recommender that functions together with a visualization tool and business analytics application. This recommender can track use of interactive visualizations provided by the visualization tool, e.g., views selected, functions performed, navigation between views, etc., by various users to build a set of inquiry histories. Then, based on these histories and possibly other considerations, recommendations can be made to a current user as to which views, functions, etc. might be useful or insightful. In other words, embodiments of the present invention track the analysis behavior of each user and recommend which views may be of interest for the corresponding analysis task based on the behavior of similar users in similar situations. Various additional details of embodiments of the present invention will be described below with reference to the figures.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
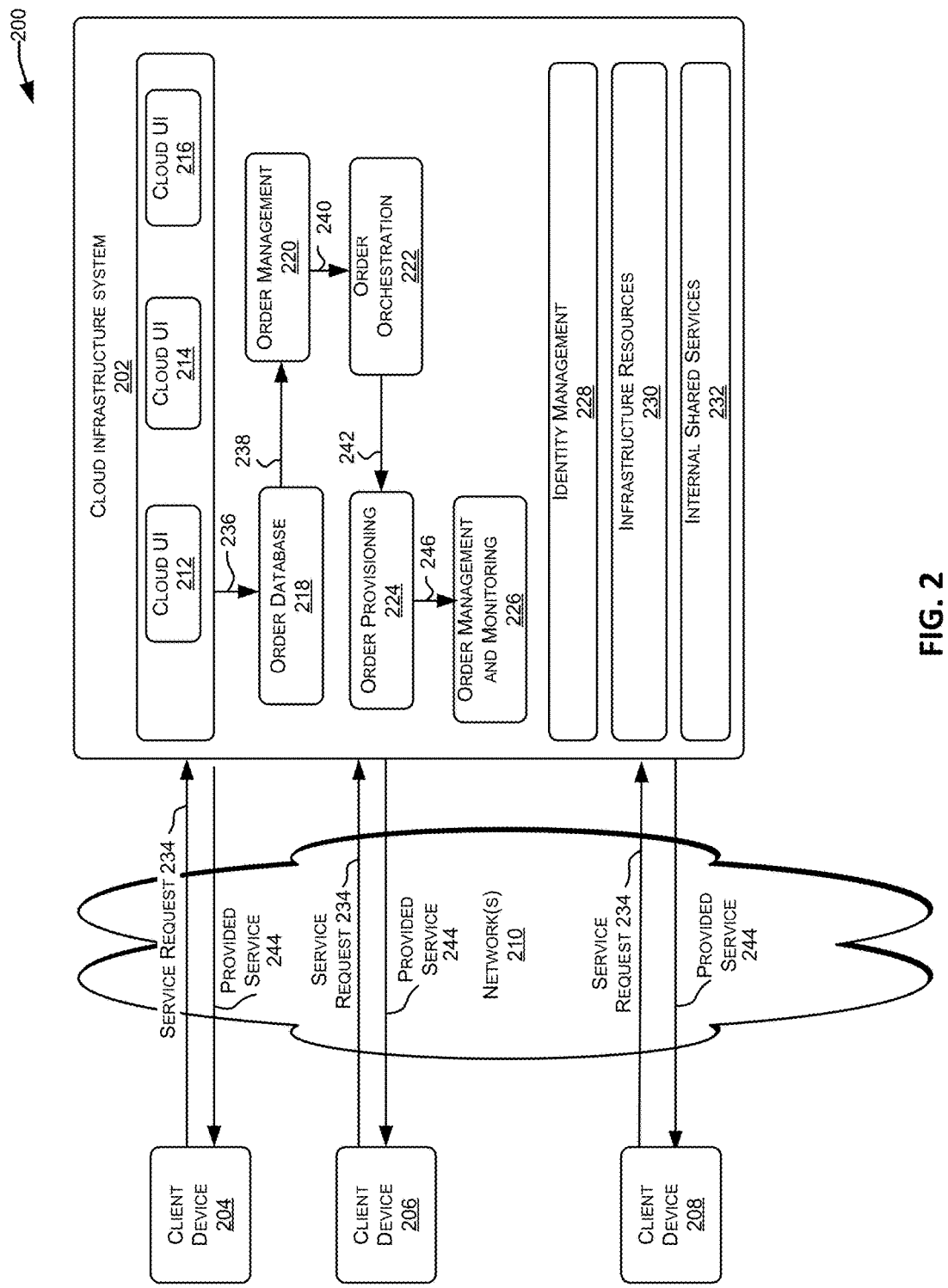
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
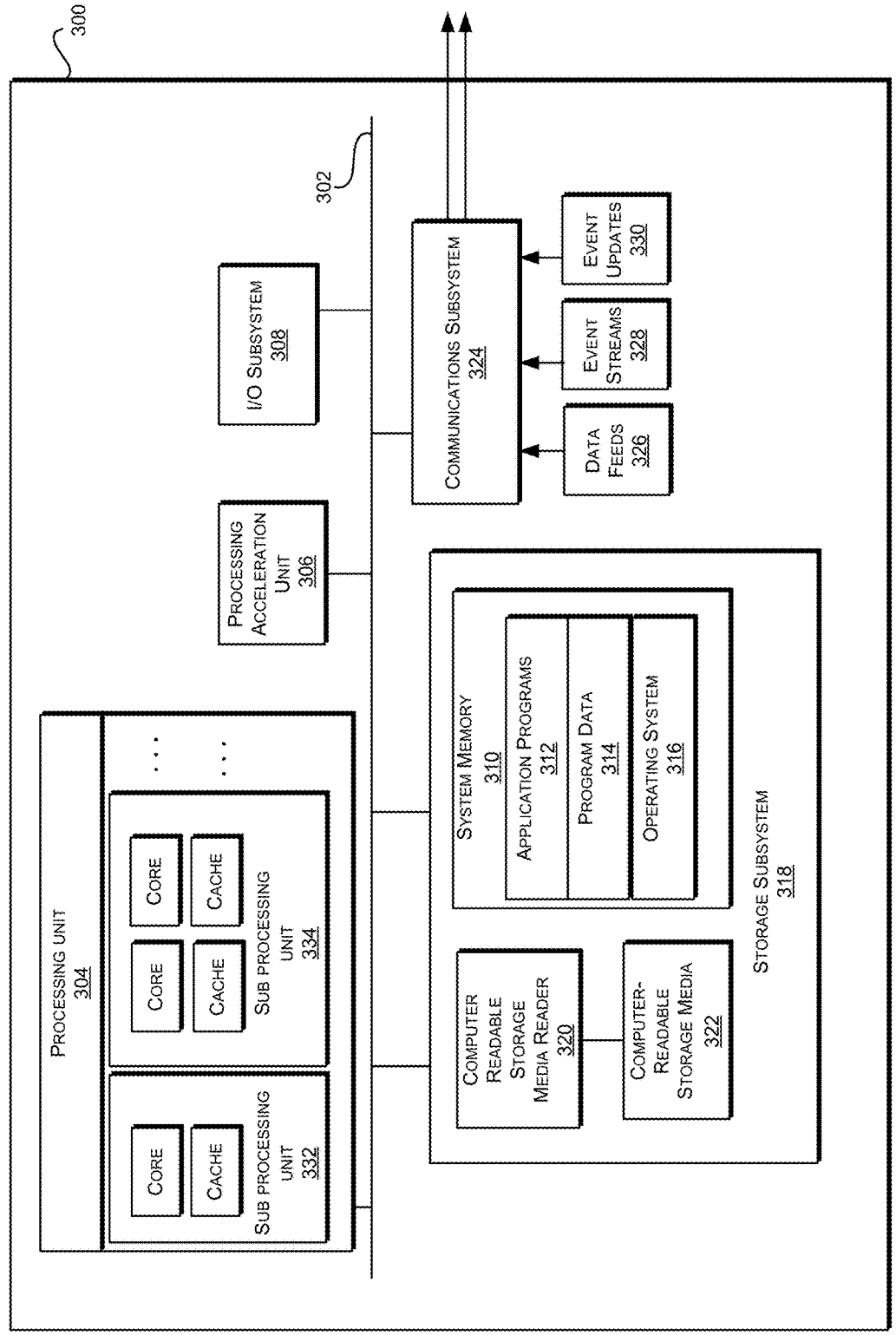
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4:
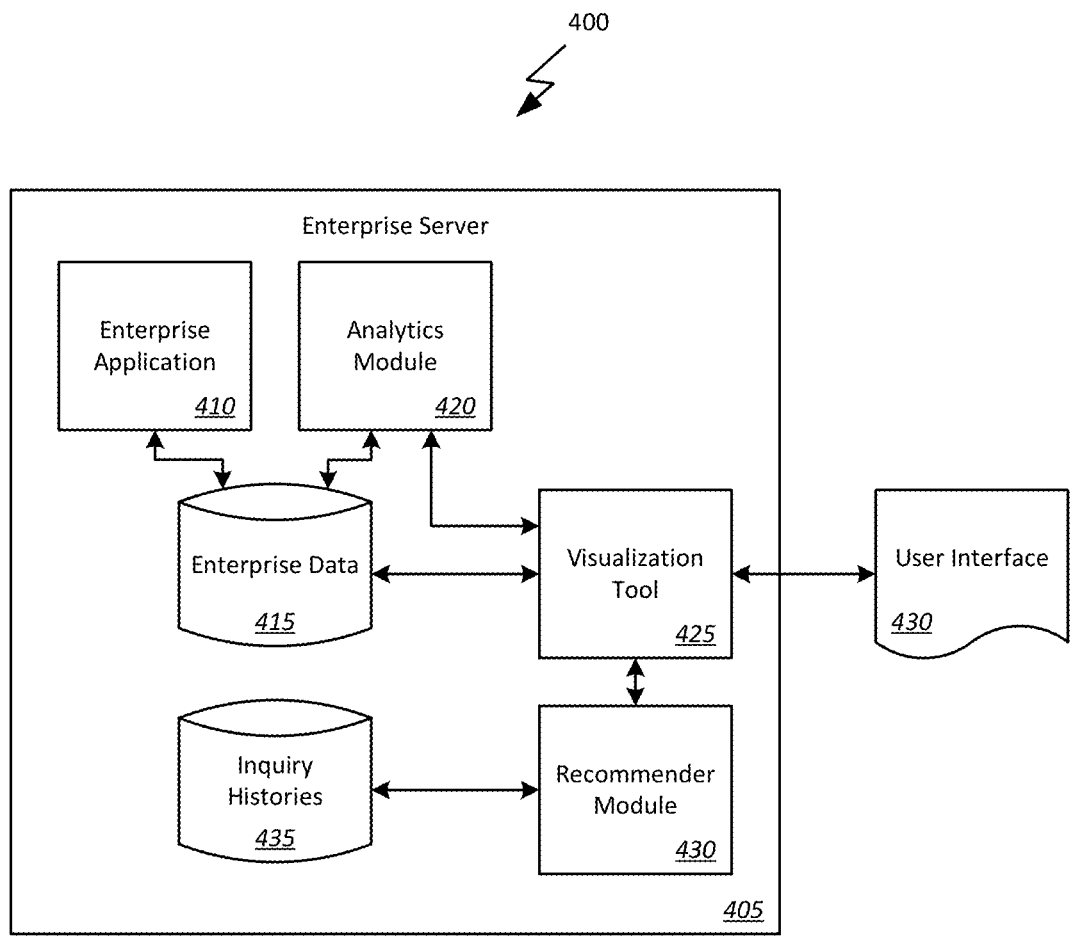
FIG. 4 is a block diagram illustrating, at a high-level, functional components of a system for providing interactive collaborative filtering according to one embodiment of the present invention.

FIG. 4 is a block diagram illustrating, at a high-level, functional components of a system for providing interactive collaborative filtering according to one embodiment of the present invention. As illustrated in this example, a system 400 can comprise an enterprise server consisting of any one or more servers or other systems such as described above. The enterprise server 405 can execute one or more enterprise applications 410 including but not limited to an accounting or financials application, a supply chain management application, a strategic planning application, a project management application, etc. The enterprise server 405 can also execute an analytics module 420 and a visualization tool 425. It should be noted that, while illustrated here as separate from the enterprise application 410 for the sake of clarity, the analytics module 420 and/or visualization tool 425 may be implemented as part of or within the enterprise application 410 in some cases. Generally speaking, the analytics module 420 can perform any of a variety of analytical functions using enterprise data 415 maintained by the enterprise application 410. These analytical functions can include but are not limited to various modeling functions, what-if analysis, statistical analysis, etc. The visualization tool 425 can provide, through a user interface 430 such as one or more web pages, any of a variety of graphs or other views of the results of the analytical functions performed by analytics module 420 and/or the enterprise data 415 upon which these functions are performed.

As introduced above, embodiments of the present invention provide a recommender module 430 also executed by the enterprise server 405. As with the analytics module and visualization tool 425, the recommender module 430 is illustrated here, for the sake of clarity as a separate module but may, depending upon the exact implementation, be provided as part of the visualization tool 425, analytics module 420, and/or enterprise application 410. Regardless of exactly how it is implemented, the recommender module 430 can function together with the visualization tool 425 and analytics module 420 to track use of interactive visualizations provided through the user interface 430 by the visualization tool 425, e.g., views selected, functions performed, navigation between views, etc., by various users to build a set of inquiry histories 435. Then, based on these histories 435 and possibly other considerations, recommendations can be made by the recommender module 430 to a current user through the user interface 430 as to which views, functions, etc. might be useful or insightful. In other words, embodiments of the present invention can track the analysis behavior of each user and recommend which views may be of interest for the corresponding analysis task based on the behavior of similar users in similar situations. Thus, when a user is looking at a particular view of the visualization through the user interface 430, the recommender module 430 can recommend other views that are similar following the "Users who looked at this view proceeded to looking at these other views" model based on the inquiry histories 435. In addition to navigating within interactive visualization, the recommender module 430 can assist the user in navigating across visualizations. Beyond recommending one individual view to look at, the recommendation module 430 can be expanded into recommending paths of inquiry based on patterns of inquiry represented in the inquiry histories 435.

Stated another way, providing interactive visualizations with collaborative filtering can comprise generating, by the recommender module 430, a plurality of inquiry histories 435 for one or more interactive visualizations provided by the visualization tool 425 based on user interactions with the interactive visualizations through the user interface 430. The one or more interactive visualizations can each provide a plurality of views of a set of application data 415. An exemplary user interface for presenting an interactive visualization will be described below with reference to FIG. 5. Generating the plurality of inquiry histories 435 for the one or more interactive visualizations can comprise the recommender module 430 monitoring the one or more interactive visualizations and detecting, based on said monitoring, the interaction of the user with the selected interactive visualization. The detected interaction can comprise, for example, a query, a navigation action from the user to navigate between views of the visualization, or another function of the visualization selected or otherwise initiated based on an action by the user through the user interface 430. The action of the user and a current state of the selected interactive visualization can be captured by the recommender module 430 and recorded as an inquiry history 435. For example, capturing the current state of the selected interactive visualization can comprise the recommender module 430 capturing one or more of a current view, one or more selected filters, one or more filter criteria, and/or one or more attributes of the interactive visualization and/or current view presented in the user interface 430. The action of the user can comprise, for example, one or more of making a query through the selected interactive visualization, selecting a function of the selected interactive visualization, or navigating through the selected interactive visualization through the user interface 430. In some cases, generating the inquiry history 435 can also include recording, by the recommender module 430, user information for the user. For example, information from the user's profile or other information may be recorded by the recommender module 430 in the history 435 to indicate any one or more of a user type, level, role, business unit, etc.

Subsequently, an interaction with a selected interactive visualization of the one or more interactive visualizations can be received by the visualization tool 425 and/or recommender module 430 from a user through the user interface 430. In some cases, this interaction may be an initial interaction with the user, i.e., when the user opens or launches the visualization tool 425, or may be a subsequent interaction as the user navigates views and interacts with the visualization through the user interface 430 presented by the visualization tool 425. In either case, the received interaction with the selected interactive visualization can comprise, for example, a query or a navigation action from the user.

A recommendation can be made by the recommender module 430 to the user based on the received interaction, the selected interactive visualization, and the generated plurality of inquiry histories 435. For example, the recommendation to the user can comprise a suggested next action. Making the recommendation to the user can comprise the recommender module 430 generating a graph representing the at least a subset of the generated and saved plurality of inquiry histories 435. Each vertices of the graph can represent a state of the interactive visualizations saved in the inquiry histories 435 and edges of the graph represent navigation between the states of the interactive visualizations saved in the inquiry histories 435. Examples of such graphs will be described below with reference to FIGS. 6A-6C. A state of the current, selected interactive visualization can also be determined by the recommender module 430. The state can include, for example, the current view and other attributes of the visualization currently presented in the user interface 430. One or more actions can be determined by the recommender module 430 based on the generated graph and the determined state of the selected interactive visualization. It should be noted that, in some cases, the inquiry histories 435 can further comprise saved user information. In such cases, determining one or more actions by the recommender module 430 can be further based on information for the user and corresponding saved user information from the inquiry histories 435, for example, to determine recommended actions based on inquiry histories 435 from similar users, e.g., users with similar titles, roles, responsibilities, etc. The determined one or more actions can then be provided by the recommender module 430 to the user as recommendations, e.g., through a view of the interactive visualization presented in the user interface 430. An exemplary user interface for presenting such recommendations will be described below with reference to FIGS. 10A and 10B.

Figure 5:
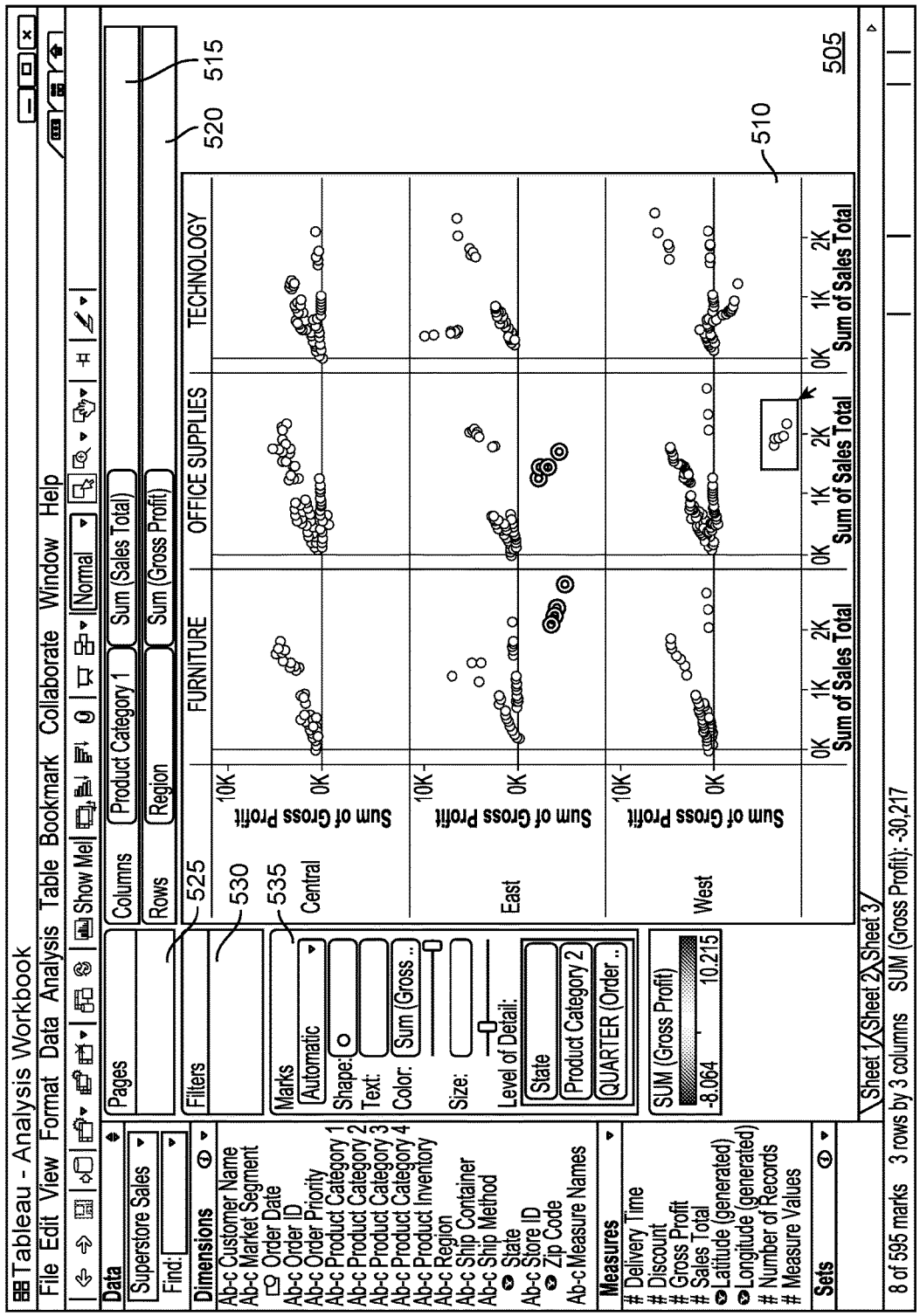
FIG. 5 is a screenshot illustrating an exemplary user interface including an interactive visualization as may be utilized with various embodiments of the present invention.

FIG. 5 is a screenshot illustrating an exemplary user interface including an interactive visualization as may be utilized with various embodiments of the present invention. More specifically, this example illustrates a page 505 providing a view of a set of application data including a graph 510 thereof. The page 505 can also include a number of controls or other elements 515, 520, 525, 530, and 525 for navigating or selecting different views, changing this view, setting or defining attributes of this or other views, etc. It should be understood that these exemplary interfaces are provided for illustrative purposes only and are not intended to limit the scope of the present invention. Rather, the actual format, content, and other features of the interfaces can vary widely between implementations without departing from the scope of the present invention.

Figure 6A:
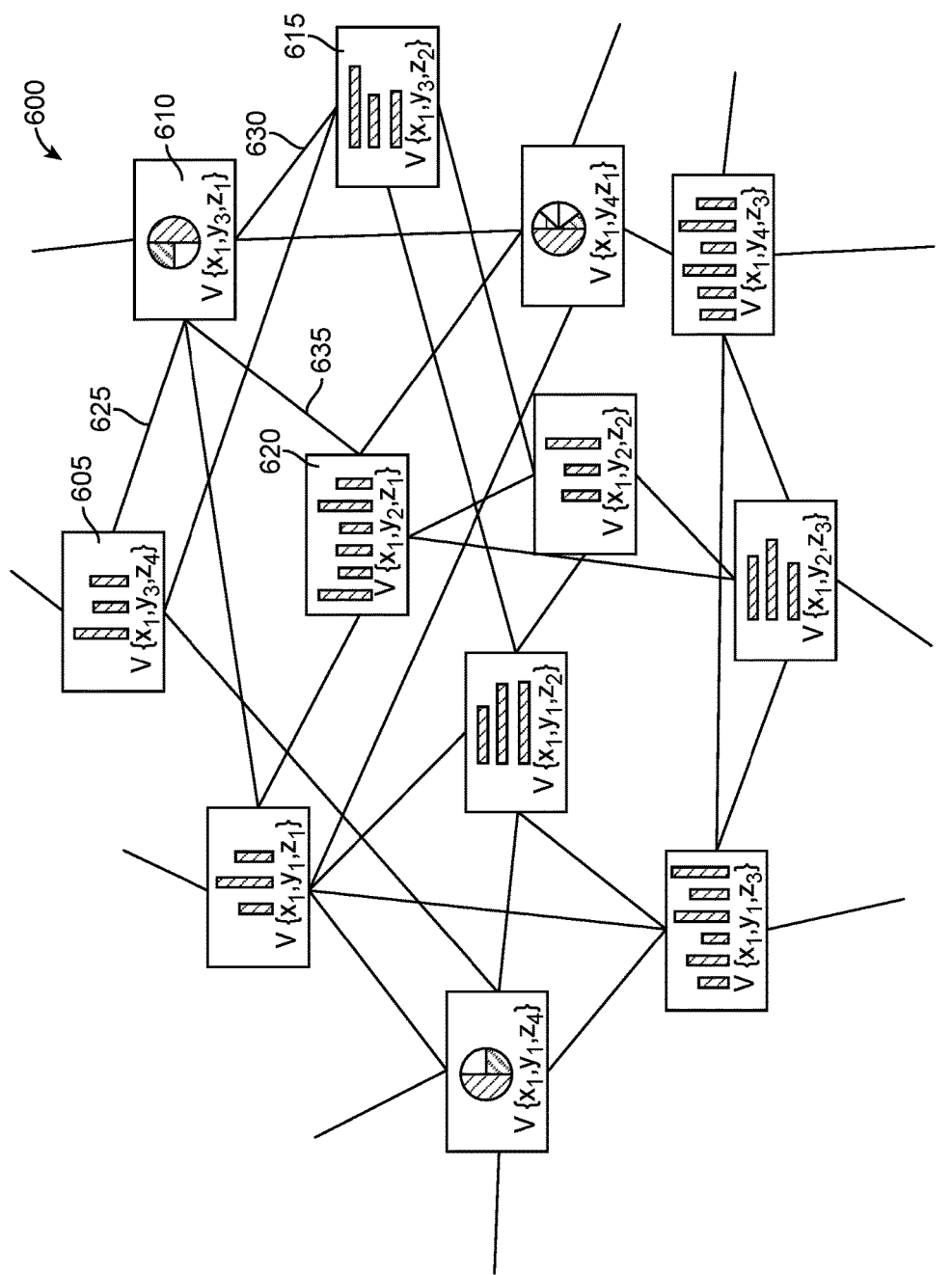
FIGS. 6A-6C are a block diagrams illustrating logical representations of graphs of inquiry paths upon which collaborative filtering of interactive visualizations may be performed according to one embodiment of the present invention.
Figure 6B:
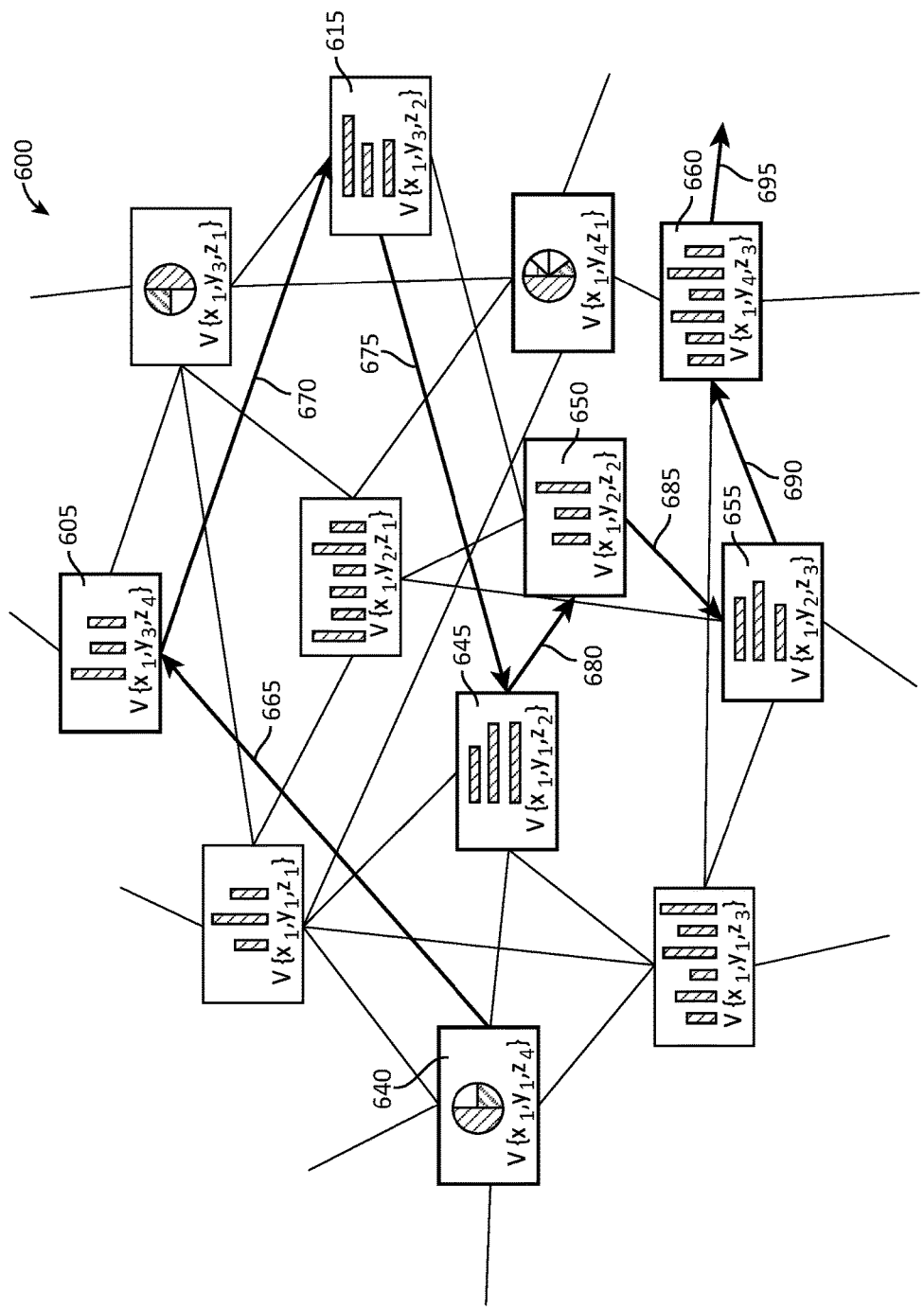
Figure 6C:
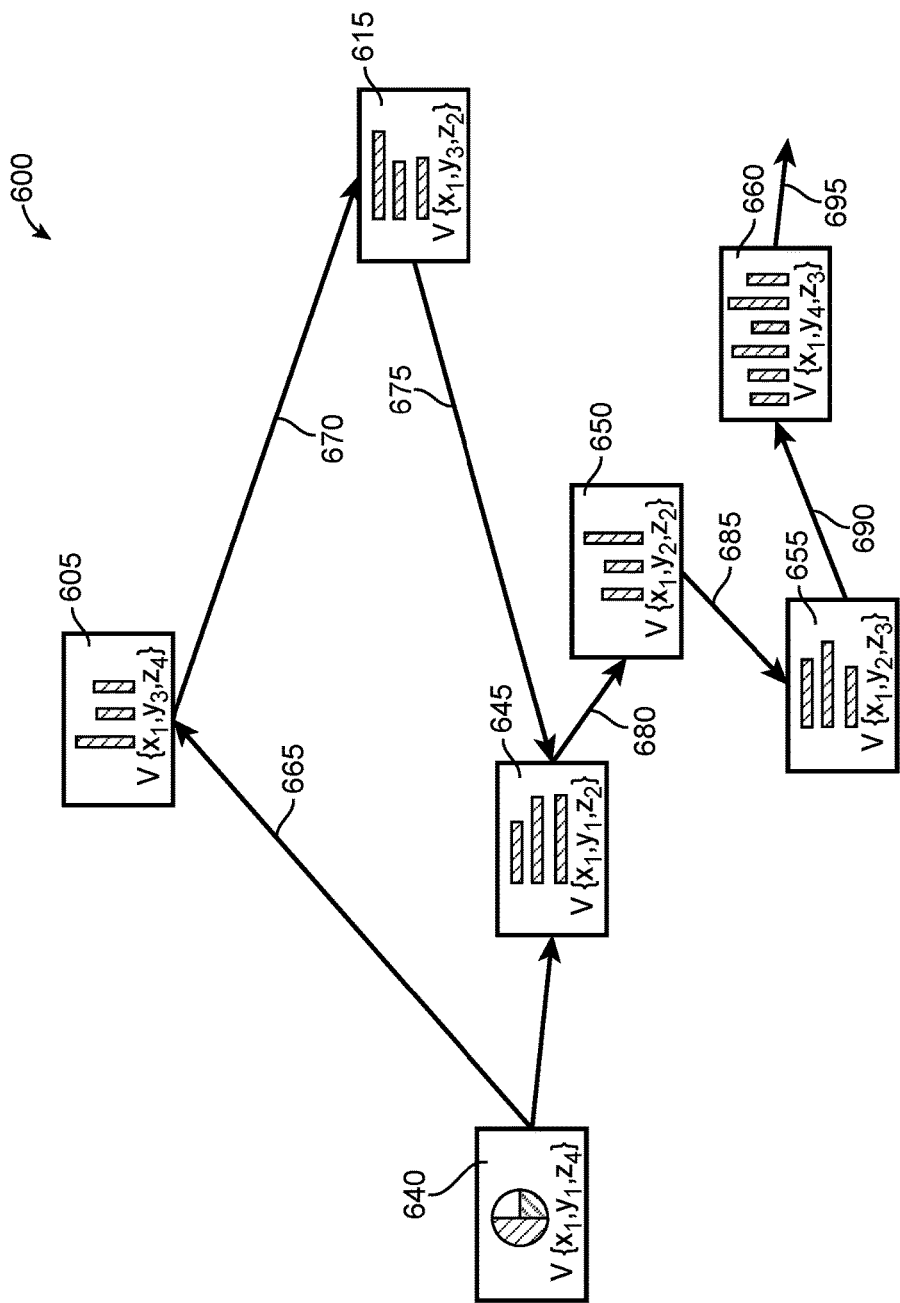

FIGS. 6A-6C are a block diagrams illustrating logical representations of graphs of inquiry paths upon which collaborative filtering of interactive visualizations may be performed according to one embodiment of the present invention. Generally speaking, visualization exploration can be considered the process of extracting insight from data via interaction with visual depictions of the data. Interacting with visual depiction of the data can be considered equivalent to navigating a multidimensional parameter space. In addition to data parameters (such as region, product, and time in the earlier example) users also have a choice of visualization type (e.g., bar chart, scatter plot, etc.) and of visualization layout (e.g. what data is plotted on x and y axis, etc.), all of which can be captured and saved as an inquiry history as described above. As a multidimensional parameter space, visualization exploration can be represented as a graph-based structure 600 where vertices 605, 610, and 615 in the graph 600 can represent the state of the visualization (view), while edges 625, 630, and 635 can represent relationships (navigation) between states. FIG. 6A illustrates such a graph 600 representation of interactive visualization space. Users trace a path through this space as they explore new results. FIG. 6B represents an exemplary inquiry path through this visualization space between visited views 605, 615, 640, 645, 650, 655, and 660 and the path 665, 670, 675, 680, 685, 690, and 695 taken between these views. Over time and as user interactions are monitored, multiple such inquiry paths can be recorded in the inquiry histories. FIG. 6C illustrates such a pattern of inquiry built from analyzing multiple similar inquiry paths. These similar or common paths can be used as a basis of recommending a next action to a user at a particular point along the path, i.e., at a particular vertex 640, a path 665 to a next vertex 605, and/or subsequent vertices, can be offered as a recommended next action.

Figure 7:
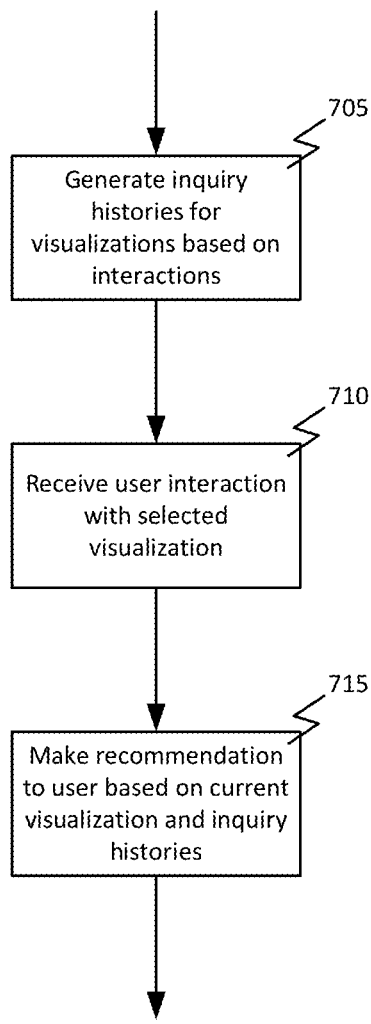
FIG. 7 is a flowchart illustrating a process for providing interactive visualizations with collaborative filtering according to one embodiment of the present invention.

FIG. 7 is a flowchart illustrating a process for providing interactive visualizations with collaborative filtering according to one embodiment of the present invention. As illustrated in this example, providing interactive visualizations with collaborative filtering can comprise generating 705 a plurality of inquiry histories for one or more interactive visualizations based on user interactions with the interactive visualizations. The one or more interactive visualizations can each provide a plurality of views of a set of application data. Additional details of an exemplary process for generating 705 the inquiry histories will be described below with reference to FIG. 8. An interaction with a selected interactive visualization of the one or more interactive visualizations can be received 710 from a user. In some cases, this interaction may be an initial interaction with the user or may be a subsequent interaction as the user navigates views and interacts with the visualization. The received interaction with the selected interactive visualization can comprise, for example, a query or a navigation action from the user. A recommendation can be made 715 to the user based on the received interaction, the selected interactive visualization, and the generated plurality of inquiry histories. For example, the recommendation to the user can comprise a suggested next action. Additional details of an exemplary process for making 715 these recommendations will be described below with reference to FIG. 9.

Figure 8:
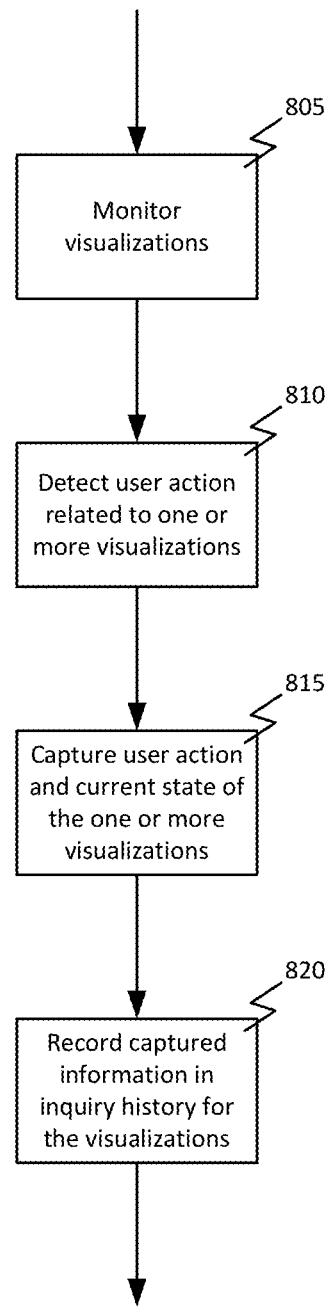
FIG. 8 is a flowchart illustrating a process for generating a set of inquiry histories based on user interactions with a set of visualizations according to one embodiment of the present invention.

FIG. 8 is a flowchart illustrating a process for generating a set of inquiry histories based on user interactions with a set of visualizations according to one embodiment of the present invention. As illustrated in this example, generating the plurality of inquiry histories for the one or more interactive visualizations can comprise monitoring 805 the one or more interactive visualizations and detecting 810, based on said monitoring 805, the interaction of the user with the selected interactive visualization. The detected interaction can comprise, for example, a query, a navigation action from the user to navigate between views of the visualization, or another function of the visualization selected or otherwise initiated based on an action by the user. The action of the user and a current state of the selected interactive visualization can be captured 815 and recorded 820 as an inquiry history. For example, capturing the current state of the selected interactive visualization can comprise capturing one or more of a current view, one or more selected filters, one or more filter criteria, and/or one or more attributes of the interactive visualization and/or current view. The action of the user can comprise, for example, one or more of making a query through the selected interactive visualization, selecting a function of the selected interactive visualization, or navigating through the selected interactive visualization. In some cases, generating the inquiry history can also include recording 820 user information for the user in the inquiry history. For example, information from the user's profile or other information may be recorded in the history to indicate any one or more of a user type, level, role, business unit, etc.

Figure 9:
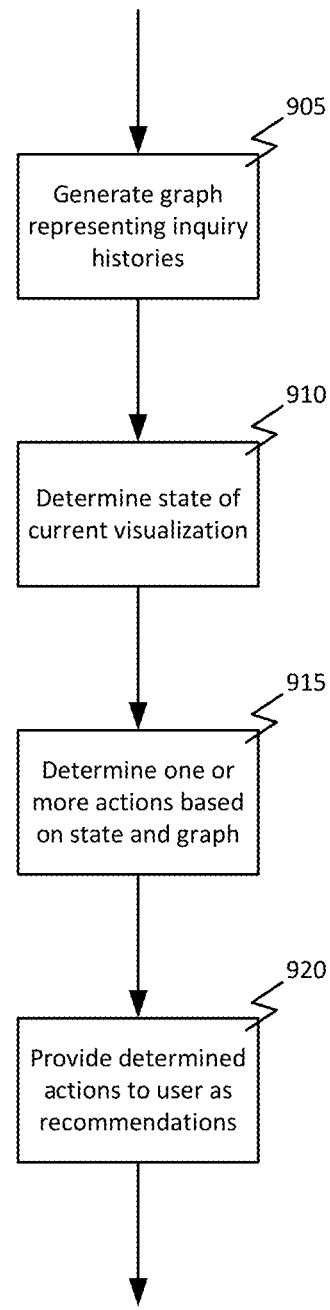
FIG. 9 is a flowchart illustrating a process for making recommendations for next actions with an interactive visualization based on a set of inquiry histories according to one embodiment of the present invention

FIG. 9 is a flowchart illustrating a process for making recommendations for next actions with an interactive visualization based on a set of inquiry histories according to one embodiment of the present invention. As illustrated in this example, making the recommendation to the user can comprise generating 905 a graph representing the at least a subset of the generated and saved plurality of inquiry histories. Each of the vertices of the graph can represent a state of the interactive visualizations saved in the inquiry histories and edges of the graph represent navigation between the states of the interactive visualizations saved in the inquiry histories. A state of the current, selected interactive visualization can be determined 910. The state can include, for example, the current view and other attributes of the visualization. One or more actions can be determined 915 based on the generated graph and the determined state of the selected interactive visualization. It should be noted that, in some cases, the inquiry histories can further comprise saved user information. In such cases, determining 915 one or more actions can be further based on information for the user and corresponding saved user information from the inquiry histories, for example, to determine recommended actions based on inquiry histories from similar users, e.g., users with similar titles, roles, responsibilities, etc. The determined one or more actions can then be provided 920, e.g., through a view of the interactive visualization, to the user as recommendations.

Figure 10A:
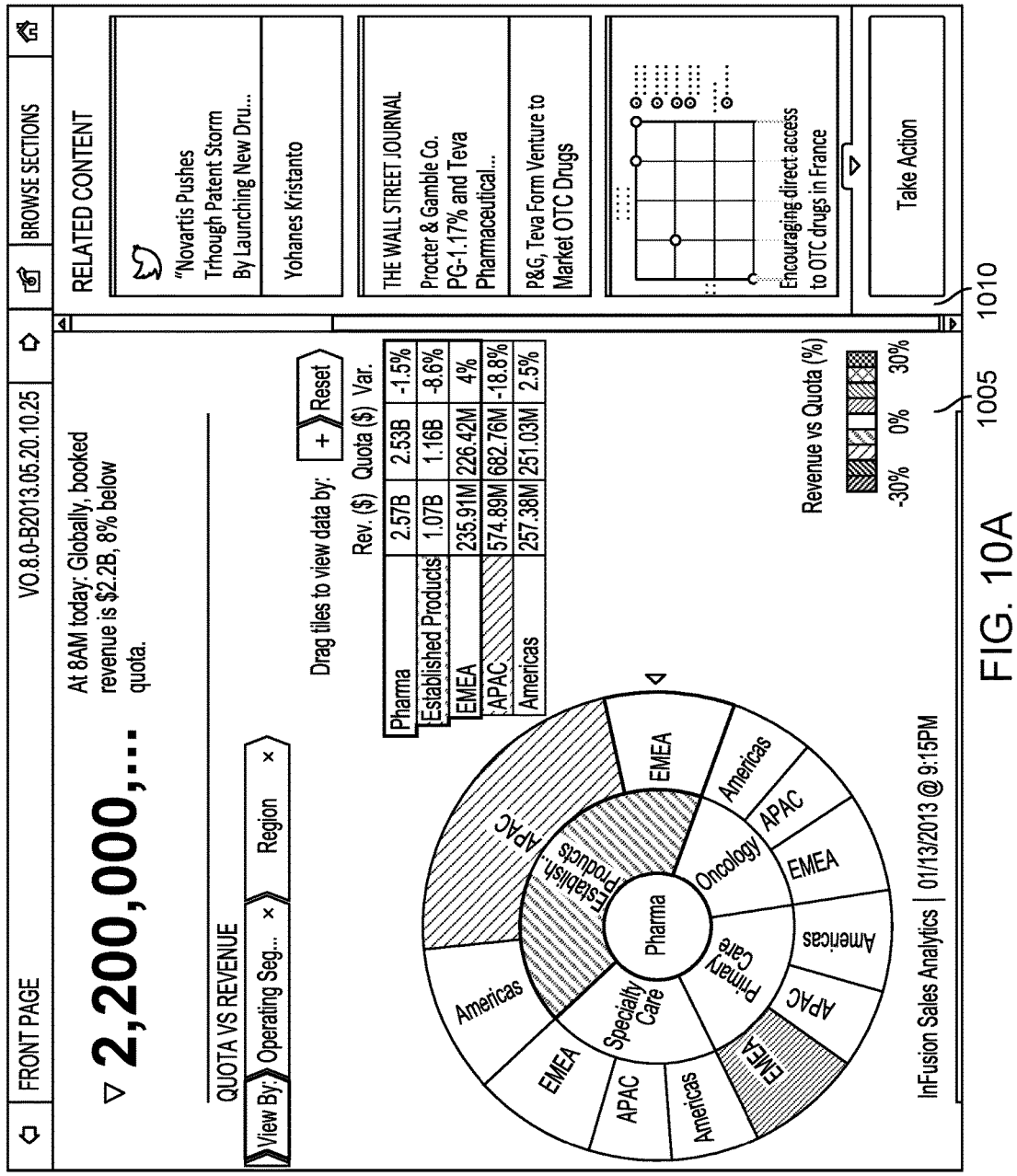
FIGS. 10A and 10B are screenshots illustrating exemplary user interfaces for providing recommendations of interactive visualizations based on collaborative filtering according to one embodiment of the present invention.
Figure 10B:
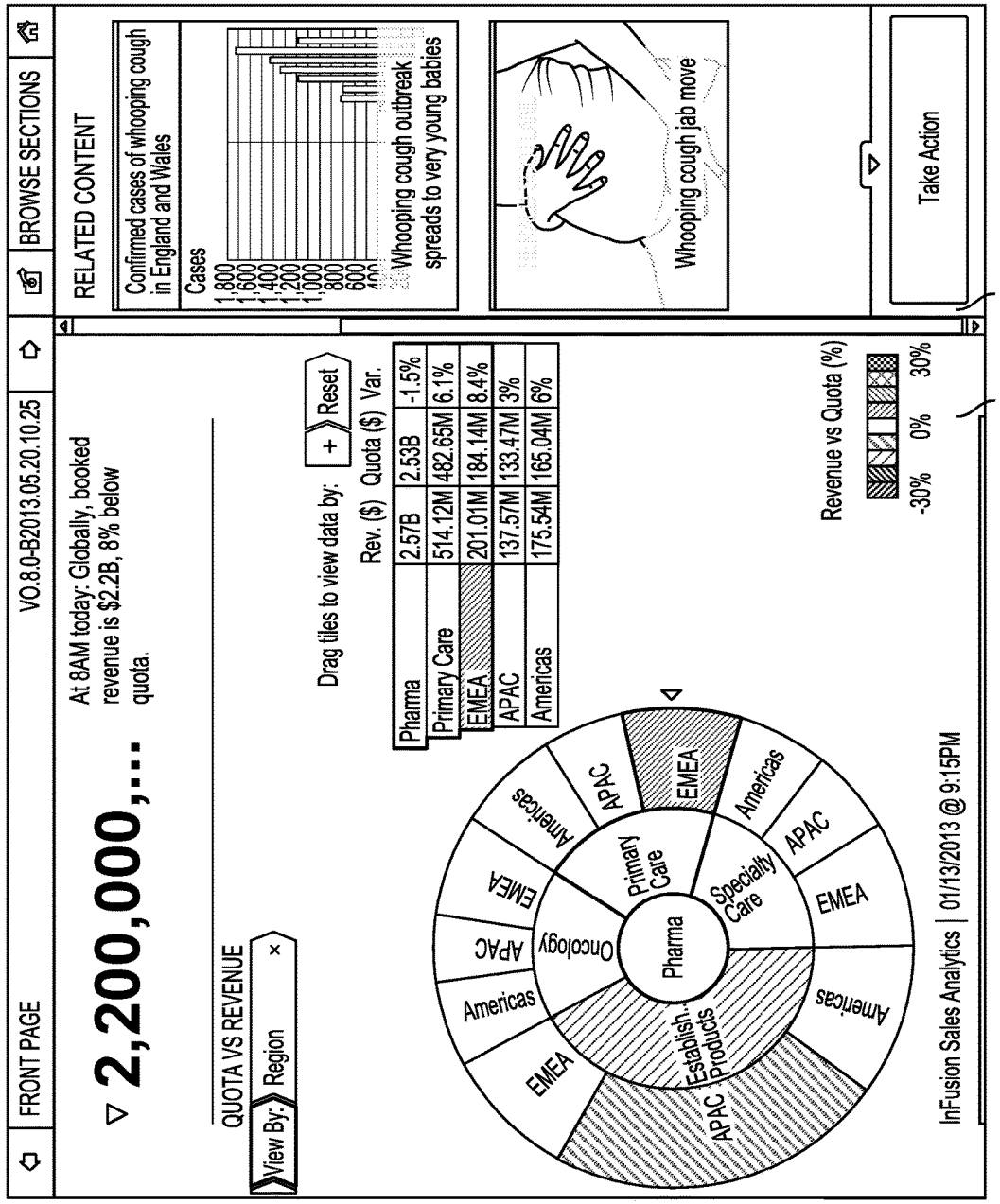

FIGS. 10A and 10B are screenshots illustrating exemplary user interfaces for providing recommendations of interactive visualizations based on collaborative filtering according to one embodiment of the present invention. As illustrated in FIG. 10A, the interface can include a view 1005 of an interactive visualization and a sidebar 1010 of related content or recommendations. The "Related Content" sidebar 1010 can contextually recommend related views and visualizations based on the state of interactive visualization. Thus, as illustrated in FIG. 10B, when the view 1015 of the interactive visualization changes, the related content or recommendations presented in the sidebar 1020 can also change based on that new context. Again, it should be understood that these exemplary interfaces are provided for illustrative purposes only and are not intended to limit the scope of the present invention. Rather, the actual format, content, and other features of the interfaces can vary widely between implementations without departing from the scope of the present invention.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
tracking interactions of a plurality of users with a plurality of views of an interactive visualization;
storing a plurality of inquiry histories for the interactive visualization, the plurality of inquiry histories representing the interactions of the plurality of users with the interactive visualization, the plurality of inquiry histories comprising, for each inquiry history of the plurality of inquiry histories, an interaction of a user with the interactive visualization and an associated view from the plurality of views of the interactive visualization;
determining a directional path comprising a subset of views from the plurality of views, wherein:
the directional path is a graph indicative of a path traced through the subset of views,
the graph is generated based on analyzing the plurality of inquiry histories representing the interactions of the plurality of users,
the graph comprises a plurality of vertices and one or more edges connecting the plurality of vertices, and each vertex in the plurality of vertices represents a view from the subset of views and each edge in the one or more edges represents a navigation between two of the subset of views that are connected by the edge;
receiving a new interaction of a first user with the interactive visualization;
in response to receiving the new interaction, determining a current view of the interactive visualization associated with the new interaction, the current view included in the plurality of views;
determining a recommendation for the first user based on the new interaction, the current view, the plurality of inquiry histories, and the directional path, the recommendation including an action to navigate from the current view to a new view, wherein the new view is included in the directional path; and
outputting the recommendation to the first user.

2. The method of claim 1, wherein the interactive visualization provides the plurality of views of a set of application data.

3. The method of claim 1, wherein the new interaction of the first user with the interactive visualization comprises a query or a navigation action.

4. The method of claim 1, wherein:
the tracking comprises:
monitoring one or more interactions of a second user from the plurality of users with a first view of the plurality of views of the interactive visualization;
based upon the monitoring, determining a first action performed by the second user on the first view; and
determining a first state of the interactive visualization; and
storing the plurality of inquiry histories comprises storing information related to the first action and the first state.

5. The method of claim 4, wherein determining the first state of the interactive visualization comprises determining one or more of the first view, one or more selected filters, one or more filter criteria, or one or more attributes of the interactive visualization.

6. The method of claim 1, wherein the new interaction of the first user comprises one or more of making a query through the interactive visualization, selecting a function of the interactive visualization, or navigating through the interactive visualization.

7. The method of claim 1, further comprising saving user information comprising one of a user type, a user level, a user role, and a user business unit for each of the plurality of users in the plurality of inquiry histories, wherein determining the recommendation for the first user uses inquiry histories from the plurality of inquiry histories comprising user information matching the user information for the first user.

8. The method of claim 1, wherein the current view is included in the directional path.

9. A system comprising:
a processor; and
a memory communicatively coupled with and readable by the processor and storing a set of instructions which, when executed by the processor, causes the processor to perform:
tracking interactions of a plurality of users with a plurality of views of an interactive visualization;
storing a plurality of inquiry histories for the interactive visualization, the plurality of inquiry histories representing the interactions of the plurality of users with the interactive visualization, the plurality of inquiry histories comprising, for each inquiry history of the plurality of inquiry histories, an interaction of a user with the interactive visualization and an associated view from the plurality of views of the interactive visualization;

determining a directional path comprising a subset of views from the plurality of views, wherein:
the directional path is a graph indicative of a path traced through the subset of views,
the graph is generated based on analyzing the plurality of inquiry histories representing the interactions of the plurality of users,
the graph comprises a plurality of vertices and one or more edges connecting the plurality of vertices, and
each vertex in the plurality of vertices represents a view from the subset of views and each edge in the one or more edges represents a navigation between two of the subset of views that are connected by the edge;

receiving a new interaction of a first user with the interactive visualization;

in response to receiving the new interaction, determining a current view of the interactive visualization associated with the new interaction, the current view included in the plurality of views;

determining a recommendation for the first user based on the new interaction, the plurality of inquiry histories, the current view, and the directional path, the recommendation including an action to navigate from the current view to a new view, wherein the new view is included in the directional path; and outputting the recommendation to the first user.

10. The system of claim 9, wherein:
the tracking comprises:
monitoring one or more interactions of a second user from the plurality of users with a first view of the plurality of views of the interactive visualization;
based upon the monitoring, determining a first action performed by the second user on the first view; and
determining a first state of the interactive visualization; and
storing the plurality of inquiry histories comprises storing information related to the first action and the first state.

11. The system of claim 10, wherein determining the first state of the interactive visualization comprises determining one or more of the first view, one or more selected filters, one or more filter criteria, or one or more attributes of the interactive visualization.

12. The system of claim 9, wherein the new interaction of the first user comprises one or more of making a query through the interactive visualization, selecting a function of the interactive visualization, or navigating through the interactive visualization.

13. The system of claim 9, wherein the processor is further caused to perform saving user information comprising one of a user type, a user level, a user role, and a user business unit for each of the plurality of users in the plurality of inquiry histories, wherein determining the recommendation for the first user uses inquiry histories from the plurality of inquiry histories comprising user information matching the user information for the first user.

14. The system of claim 9, wherein the interactive visualization provides the plurality of views of a set of application data.

15. The system of claim 9, wherein the new interaction of the first user with the interactive visualization comprises a query or a navigation action.

16. One or more non-transitory computer-readable media storing computer-executable instructions executable by one or more processors, the computer-executable instructions comprising:
instructions that cause the one or more processors to track interactions of a plurality of users with a plurality of views of an interactive visualization;
instructions that cause the one or more processors to store a plurality of inquiry histories for the interactive visualization, the plurality of inquiry histories representing the interactions of the plurality of users with the interactive visualization, the plurality of inquiry histories comprising, for each inquiry history of the plurality of inquiry histories, an interaction of a user with the interactive visualization and an associated view from the plurality of views of the interactive visualization;
instructions that cause the one or more processors to determine a directional path comprising a subset of views from the plurality of views, wherein:
the directional path is a graph indicative of a path traced through the subset of views,
the graph is generated based on analyzing the plurality of inquiry histories representing the interactions of the plurality of users,
the graph comprises a plurality of vertices and one or more edges connecting the plurality of vertices, and
each vertex in the plurality of vertices represents a view from the subset of views and each edge in the one or more edges represents a navigation between two of the subset of views that are connected by the edge;
instructions that cause the one or more processors to receive a new interaction of a first user with the interactive visualization;
instructions that cause the one or more processors to determine a current view of the interactive visualization associated with the interaction, the current view included in the plurality of views;
instructions that cause the one or more processors to determine a recommendation for the first user based on the new interaction, the plurality of inquiry histories, the current view, and the directional path, the recommendation including an action to navigate from the current view to a new view, wherein the new view is included in the directional path; and
instructions that cause the one or more processors to output the recommendation to the first user.

17. The one or more non-transitory computer-readable media of claim 16, wherein:
the instructions that cause the one or more processors to track interactions of a plurality of users with a plurality of views of an interactive visualization comprises:
instructions that cause the one or more processors to monitor one or more interactions of a second user from the plurality of users with a first view of the plurality of views of the interactive visualization;
instructions that cause the one or more processors to determine a first action performed by the second user on the first view based upon the monitoring; and
instructions that cause the one or more processors to determine a first state of the interactive visualization; and
the instructions that cause the one or more processors to store the plurality of inquiry histories comprises instructions that cause the one or more processors to store information related to the first action and the first state.

18. The one or more non-transitory computer-readable media of claim 17, wherein the instructions that cause the one or more processors to determine the first state of the interactive visualization comprises instructions that cause the one or more processors to determine one or more of the first view, one or more selected filters, one or more filter criteria, or one or more attributes of the interactive visualization.

19. The one or more non-transitory computer-readable media of claim 16, wherein the new interaction of the first user comprises one or more of making a query through the interactive visualization, selecting a function of the interactive visualization, or navigating through the interactive visualization.

20. The one or more non-transitory computer-readable media of claim 16, wherein the computer-executable instructions further comprise instructions that cause the one or more processors to save user information comprising one of a user type, a user level, a user role, and a user business unit for each of the plurality of users in the plurality of inquiry histories, wherein determining the recommendation for the first user uses inquiry histories from the plurality of inquiry histories comprising user information matching the user information for the first user.

* * * * *

UNITED STATES PATENT AND TRADEMARK OFFICE
CERTIFICATE OF CORRECTION

PATENT NO. : 10,192,175 B2
APPLICATION NO. : 14/259196
DATED : January 29, 2019
INVENTOR(S) : Blyumen It is certified that error appears in the above-identified patent and that said Letters Patent is hereby corrected as shown below:

On the Title Page

Column 2, Item (56), under Other Publications, Line 2, delete "www.inforrnationweek.com/" and insert -- www.informationweek.com/ --, therefor.

In the Specification

In Column 3, Line 8, after "invention" insert -- . --.

Signed and Sealed this
Fourth Day of February, 2020

Andrei Iancu
*Director of the United States Patent and Trademark Office*